United States Patent
Piper

[15] 3,665,151
[45] May 23, 1972

[54] APPARATUS FOR PREVENTING CARBON DIFFUSION IN ELECTRIC DISCHARGE SINTERING

[72] Inventor: Thomas E. Piper, Los Altos, Calif.
[73] Assignee: The United States of America as represented by the Secretary of the Navy
[22] Filed: July 24, 1969
[21] Appl. No.: 844,351

[52] U.S. Cl............................................219/149, 75/223
[51] Int. Cl..........................................B23f 3/10, C22c 25/00
[58] Field of Search..............75/200 A, 200 C, 200 E, 200 F, 75/200 N, 200 R, 208, 223; 219/119, 149

[56] References Cited

UNITED STATES PATENTS

| | | | |
|---|---|---|---|
| 3,317,705 | 5/1967 | Inoue | 219/149 |
| 1,071,488 | 8/1913 | Weintraub et al. | 219/119 X |
| 3,546,413 | 12/1970 | Ishizuka | 219/149 X |
| 3,115,408 | 12/1963 | Knight | 75/200 |

FOREIGN PATENTS OR APPLICATIONS

| | | | |
|---|---|---|---|
| 1,282,645 | 12/1961 | France | 75/223 |
| 591,142 | 8/1947 | Great Britain | 75/223 |

Primary Examiner—R. F. Staubly
Attorney—R. S. Sciascia and J. A. Cooke

[57] ABSTRACT

An apparatus for sintering metallic particles to form coherent objects wherein an electric spark is developed between slightly compacted particles disposed in a mold. A carbon diffusion barrier is provided between a pair of electrodes and the particles in the mold to prevent diffusion of carbon into the mold.

3 Claims, 1 Drawing Figure

Patented May 23, 1972
3,665,151
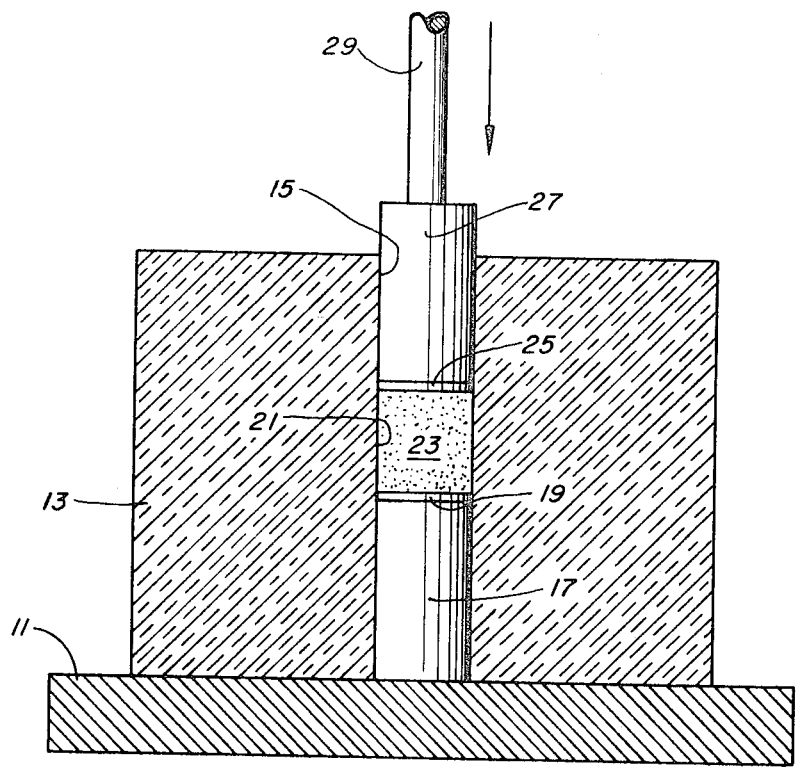
Thomas E. Piper
INVENTOR
J. O. Tresansky
ATTORNEY
BY Edwin McClelland
AGENT

APPARATUS FOR PREVENTING CARBON DIFFUSION IN ELECTRIC DISCHARGE SINTERING

BACKGROUND OF THE INVENTION

This invention relates generally to the electric-discharge sintering of discrete bodies to form coherent objects and more particularly to apparatus for the sintering of beryllium powder.

One of the earliest and best known of the sintering techniques, which have found considerable utility in the field of powder metallurgy for producing objects having shapes which may range from relatively simple forms as billets or cylinders to quite complex structures, involves the heating of a mass of metallic particles in a suitable mold under extremely high pressure to effect a welding of the particles together under the elevated pressure. More recently, the sintering together of a mass of metallic particles has been accomplished by disposing them in relatively light contacting relationship, i.e., under a mechanically applied pressure up to about 100 kg./cm.$^2$ but often as low as the gravitational force resulting from the piling of the particles, and effecting a space discharge within the mass of particles so that an electrical spark develops between adjacent bodies or particles. Such a spark sintering process is described in Inoue, U.S. Pat. No. 3,250,892, granted May 10, 1966, wherein it is disclosed that the electric spark forces the particles into bonding contact with a pressure even greater than that attainable by mechanical means even when the particles are in relatively light contact.

Where metallic beryllium is the powdered mass being sintered and electrodes formed of graphite or carbon material are utilized for producing a spark discharge across the beryllium particles, carbon is likely to diffuse into the metallic beryllium particles, and whenever beryllium and carbon are heated in contact with each other at temperatures above about 900° C., beryllium carbide Be$_2$C is produced. This reaction may be noticeably evident in the sintered beryllium objects being produced by the appearance of carbide spots on the objects. At 900° C. the rate of reaction is relatively slow, but the reaction rate increases quite rapidly with increasing temperature. At approximately 1,150° C., or above, the reaction produced may be violently exothermic. Unfortunately, the sintering temperature for metallic beryllium particles is within the temperature range at which beryllium carbide will be formed.

SUMMARY OF THE INVENTION

Accordingly, it is an object of the present invention to provide an improved apparatus for producing sintered bodies.

Another object of this invention is to provide a apparatus for preventing the formation of a carbide during a spark sintering operation by carbon electrodes.

Still another object of the invention is to provide means in an electric-discharge sintering apparatus for preventing diffusion of carbon from discharge-producing electrodes into the metallic particles being sintered.

Yet another object of the invention is to provide an apparatus for electrically sintering metallic particles together into an object free of any carbide defects.

The foregoing and other objects are attained by placing a barrier of high melting point metallic foil or sheet at the interface or boundary of the metallic beryllium being sintered and the graphite or carbon electrodes producing an electrical discharge across the beryllium particles.

BRIEF DESCRIPTION OF THE DRAWING

Still other objects and many of the attendant advantages of this invention will be readily appreciated as the same becomes better understood by reference to the detailed description when considered in connection with the accompanying drawing wherein the single FIGURE is an axial cross-sectional view illustrating a system constructed in accordance with the teachings of the present invention for the spark-discharge sintering of discrete electrically conductive particles into a coherent object.

DESCRIPTION OF A PREFERRED EMBODIMENT

The apparatus illustrated in the single FIGURE of the drawing comprises a support 11 upon which is mounted a refractory die or mold 13 of ceramic material or another similar material suitable for the purpose. As shown, the mold 13 is provided with a through bore 15 in which a cylindrical electrode 17 is disposed at the lower end thereof and in contact with the support 11. The electrode 17 is composed of graphite or other carbon material.

A very thin metal disc 19 of the same diameter as the bore 15 is disposed within the bore upon the end face of the cylindrical electrode 17. The metal disc may be formed of tantalum, tungsten, stainless steel, or any other electrically conductive material suitable for inhibiting the diffusion therethrough of carbon.

A portion of the bore 15 just above the electrode 17 and the disc 19 comprises the die or mold chamber 21, which is filled with beryllium particles or powder 23. An upper, thin metal disc 25 of the same dimensions and composition as the disc 19 is positioned on top of the mass of particles 23.

The beryllium particles 23 within die chamber 21 are slightly compacted beneath the metal disc 25 by a second cylindrical electrode 27 connected to a piston member 29 for limited sliding movement within the bore 15 of the mold 13. The piston 29 may be operated hydraulically or mechanically in any conventional manner to provide the desired pressure application to the particles, particularly when the particles are cooling after being spark-sintered, until they are once again in a plastically nondeformable state.

The electrodes 17 and 27 are bridged by a source of power and suitable circuitry, not shown, for developing a spark discharge across the electrodes to thereby sinter together the particles 23 in the form determined by the specific configuration of the die chamber 21. The circuitry required for this purpose is conventional and well known in the art. A number of suitable circuits are shown in the aforementioned U.S. Pat. No. 3,250,892 to Inoue. During the sintering process, the barrier formed by the metal discs 19 and 25 prevents the electrodes 17 and 27 from directly contacting the metal particles that are being sintered and thereby inhibits any carbon diffusion from the electrodes into the die chamber 21 where a carbide might be produced.

Although the invention has been described in relation to the sintering of beryllium, it is to be understood that it is equally applicable to the spark sintering of any metal where such a barrier is desirable.

From the foregoing description it will be seen that the carbon diffusing barrier of the present invention fully accomplishes the aims, objects and advantages sought thereby for the spark sintering art. Obviously many modifications and variations of the invention are possible in the light of the above teachings. It is therefore to be understood that within the scope of the appended claims the invention may be practiced otherwise than as specifically described.

What is claimed is:

1. In an apparatus limited to sintering discrete electrically conductive particles of beryllium, having a pair of spaced carbon electrodes, retaining means for supporting a mass of said particles in relatively light contacting relationship between said electrodes, and means for applying a current across said electrodes to produce a spark discharge between said particles and thereby fuse said particles together, the improvement comprising:

a metallic disc disposed between each of said electrodes and said mass of particles in said retaining means thereby preventing diffusion of carbon into the mass.

2. The apparatus of claim 1 wherein said metallic discs are composed of tantalum.

3. The apparatus of claim 1 wherein said metallic discs are composed of tungsten.

* * * * *